United States Patent [19]

Ohnstad

[11] 4,054,473
[45] Oct. 18, 1977

[54] METHOD FOR SEALING JOINTS IN PLASTIC LINED PIPES

[75] Inventor: Burl B. Ohnstad, Thousand Palms, Calif.

[73] Assignee: Ameron, Inc., Monterey Park, Calif.

[21] Appl. No.: 635,704

[22] Filed: Nov. 26, 1975

[51] Int. Cl.² .......................... F04B 2/00; B29C 19/06
[52] U.S. Cl. .................................... 156/71; 156/275; 156/294; 156/304
[58] Field of Search ................... 156/275, 304, 293, 4, 156/71

[56] References Cited

U.S. PATENT DOCUMENTS

| | | | |
|---|---|---|---|
| 3,049,465 | 8/1962 | Wilkins | 156/275 |
| 3,061,503 | 10/1962 | Gould et al. | 156/275 |
| 3,671,346 | 6/1972 | Tsuzuki | 156/275 |
| 3,734,795 | 5/1973 | Griffith | 156/275 |
| 3,918,749 | 11/1975 | Taylor | 156/275 |

*Primary Examiner*—Douglas J. Drummond
*Attorney, Agent, or Firm*—Christie, Parker & Hale

[57] ABSTRACT

The thermoplastic lining at a joint between adjacent lined pipe sections is sealed by means of a preformed elongated flat strip of thermoplastic material having resistance heater elements in spaced parallel relation along either side of the strip. The strip is placed circumferentially around the inside of the joint with the width of the strip bridging the joint and with the heater elements in contact with the respective liners on either side of the joint. Pressure is applied radially outwardly against the strip to urge the strip against the liners, and electric current is then passed through the heater elements to fuse the strip to the respective liners and seal off the joint.

3 Claims, 7 Drawing Figures

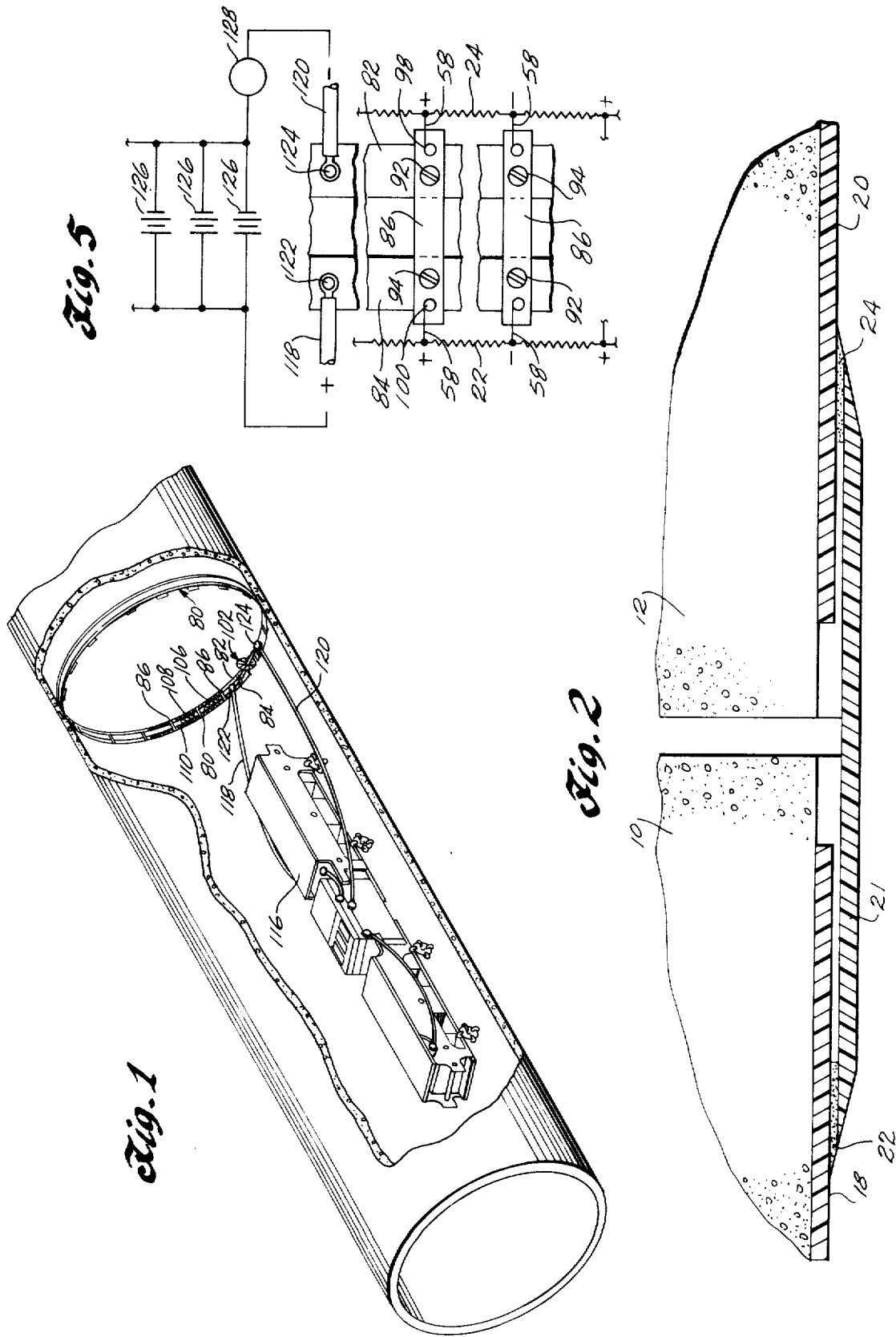

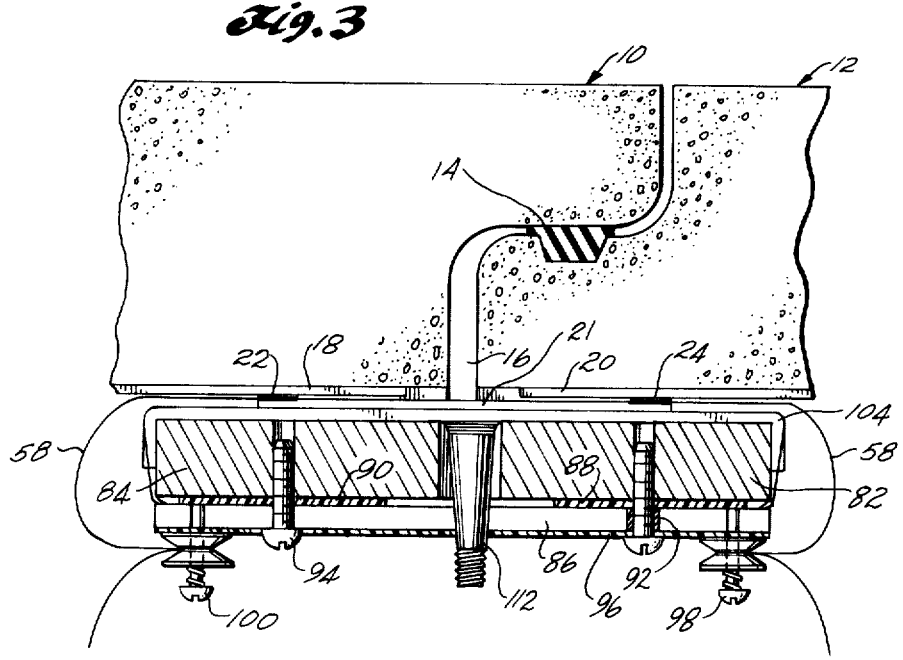
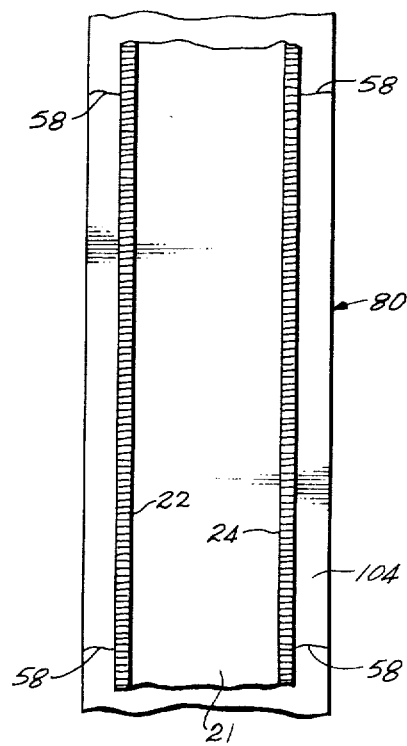

METHOD FOR SEALING JOINTS IN PLASTIC LINED PIPES

FIELD OF THE INVENTION

This invention relates to plastic lined pipe and, more particularly, to apparatus and method for sealing the joint between plastic lined pipe sections.

BACKGROUND OF THE INVENTION

In order to prevent the disintegration of concrete structures in the presence of severe chemical and physical abuse, concrete pipe, tunnels, tanks, and other structures have incorporated plastic linings made of polyvinyl chloride resins or other suitable materials to form an extremely dense, impervious and chemically resistant liner. These liners may be cast into place so that they are mechanically locked into concrete surfaces or adhesive bonded to other surfaces to become a permanent and integral part of the structure.

When sections of lined concrete pipe are joined, it is necessary that the plastic liners be sealed in a manner that maintains the integrity of the lining at the joint. Various methods have heretofore been proposed for joining the liners at the joints to form a seal. One such method utilizes a liner which is allowed to extend beyond the end of the pipe so that the liner of one pipe section can telescope inside the liner of the adjoining pipe section in overlapping relationship. Where the liners overlap, they can be either fused, cemented, or otherwise joined to form a fluid-tight junction. This requires special casting techniques and the extended lining is susceptible to damage during the pipe casting and installation operations. An alternative arrangement is to use a joint strip which overlaps the liners on either side of the joint. This of course in effect doubles the length of seam which must be sealed. One method heretofore employed has been to fuse a polyvinyl chloride strip over the pipe joint using an electrically-heated air gun. This has proved much too slow and expensive in providing a doublewelded joint.

SUMMARY OF THE INVENTION

The present invention is directed to an improved method and apparatus for field welding a separate strip in overlapping relationship to the liners at a joint between concrete pipe sections. Furthermore the present invention provides an arrangement by which joints can be readily formed in pipes having a wide range of diameters using the same materials and equipment. The time required for forming the welded joint is substantially constant regardless of the circumferential length of the joint being sealed.

This arrangement, in brief, involves forming elongated heater elements by helically wrapping a continuous core of thermoplastic material, such as PVC, with a resistance wire. Twisted loops of the wire extend out from the core at equal intervals along the length of the heater element to serve as electrical conductors. A pair of heater elements then have their cores fused under heat and pressure to one side of a welding strip of similar thermoplastic material, the heater elements being positioned along opposite margins of the strip in spaced parallel relationship to each other. At the time of installation, a section of the welding strip with heater elements attached is cut to a length corresponding to the circumference of the joint being sealed, the welding strip being placed around the outside of an expandable ring which holds the strip in place against the liners of adjacent pipe sections at a pipe joint. The loops in the resistance wire of the two heater elements are connected so that all intervening sections of the heater elements are connected in parallel across a suitable power supply. Current is passed through the heater element sections for a period of time sufficient to produce heating and fusing of the heater element core to the pipe liners.

DESCRIPTION OF THE DRAWINGS

For a better understanding of the invention reference should be made to the accompanying drawings, wherein:

FIG. 1 is a perspective view of pipe sections partly cut away showing the joint welding equipment in operative position;

FIG. 2 is a detailed sectional view of a joint after the liners have been joined by a welding strip;

FIG. 3 is a detailed sectional view of a joint with the welding ring in place;

FIG. 4 is a partial view of the welding strip mounted on the weld-forming ring;

FIG. 5 is a detail of the wiring arrangement of the weld-forming ring associated welding strip, and power supply;

DETAILED DESCRIPTION

Figure 6:
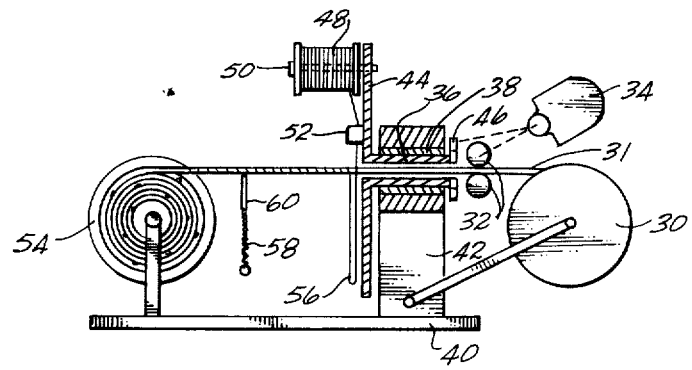
FIG. 6 is a schematic showing of a machine for forming the heater element.

Referring to the drawings in detail, 10 and 12 indicate the walls of two adjacent sections of concrete pipe. The pipe sections are joined in the field in conventional manner by a telescoping joint, including a gasket 14 and mortar or other suitable material, as indicated at 16. Each of the pipe sections is precast with a plastic liner which becomes a permanent and integral part of the structure, the liners being indicated at 18 and 20. The liners terminate at the adjoining ends of the pipe sections leaving a gap between the liners at the joint. The liner is usually made of a thermoplastic material such as a polyvinyl chloride. While the liner may extend around the full 360° circumference of the interior of the pipe, it is more common to have the liner extend only partially around the interior of the pipe, such as around the upper arch of the pipe where the pipe is exposed to corrosive vapors which otherwise would eat away the cement or concrete.

According to the present invention, a joint seal is provided which bridges the gap in the liners at the joint so as to form a continuous plastic barrier. This is accomplished by providing a welding strip 21 which is preformed, in a manner hereinafter described in detail, with a pair of spaced parallel electrical resistance type heater elements 22 and 24 running along the longitudinal edges of the strip on one side of the strip. The heater elements 22 and 24 consist of a helically wrapped resistance wire wound on a core of polyvinyl chloride material, the polyvinyl chloride core being fused to the welding strip 21 to hold the heater elements in place. The width of the welding strip is substantially larger than the gap in the liner between adjacent liners at pipe joints so that the strip is wide enough to bridge the gap and overlap the two liners.

A machine for forming the heater elements is shown in FIG. 6. A supply reel 30 feeds a thin filament 31 of PVC through a pair of feed rollers 32 driven in conventional manner by means of a gear head motor 34. Typically the PVC filament 31 is a 5/16 inch wide strip with a 40 mil thickness. The strip is fed through the hollow center of a shaft 36 which is journaled in a bearing 38 supported on a base 40 by a supporting frame 42. One end of the shaft 36 is attached to a disk 44 while the other end is coupled through a suitable gear drive 46 to the drive motor 34.

A spool of resistance wire, indicated at 48, is rotatably mounted on a spindle 50 attached to the disk 44. The wire, which is typically a 29 AWG annealed bare copper wire, is wound on the filament 31 by the rotation of the disk 44, the wire passing through a guide loop 52. The rate of rotation of the disk 44 relative to the rate of feed of the filament 31 provides a helical wrap of the wire on the strip at a pitch spacing of, for example, 0.091 inch. The resulting heater element strip is wound onto a take-up reel 54 which may be driven in any suitable manner (not shown).

One of the features of the present invention is that the heater strip is electrically segmented by bringing out an extended loop of the wire at spaced intervals, for example at intervals of 12 inches. With the machine stopped, the wire is pulled off the reel to form a loop, as indicated at 56. The wire forming the loop is then twisted, as indicated at 58, and a short length of insulated tubing 60 is applied over the wire. The take-up reel 54 is open on one side, allowing the twisted loops to be brought out to one side as the heater element is wrapped onto the take-up reel.

Figure 7:
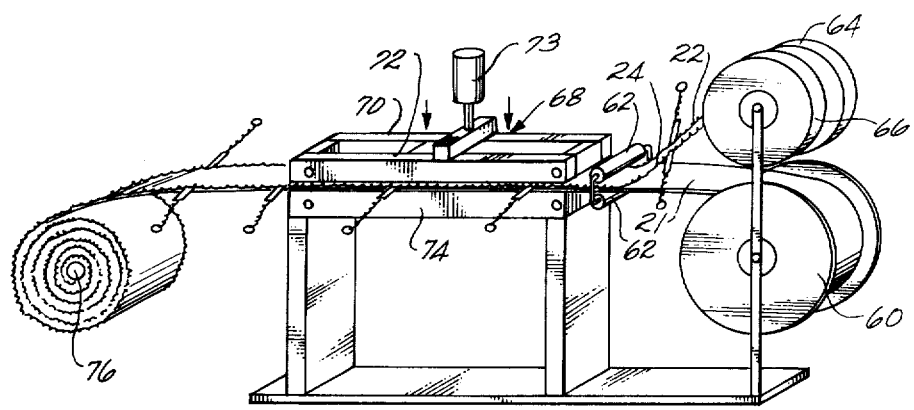
FIG. 7 is a schematic showing of a machine for attaching the heater elements to the welding strip.

Once the heater elements are formed in this manner, a pair of the heater element strips are fixed to one side of a welding strip in the manner shown in FIG. 7. The welding strip 21, as described above in connection with FIG. 2, consists of an elongated strip of PVC material which may, for example, be 4 inches in width and 3/32 inch in thickness. The strip 21 is wound off of a supply reel 60 and fed through a pair of drive rollers 62. Also fed through the drive rollers 62 are a pair of heater element strips 22 and 24 from suitable supply reels 64 and 66. The heater elements are pressed against the surface of the welding strip 21 by the rollers 62 in spaced parallel relationship along either margin of the strip 21. A rectangular frame 68 having a pair of parallel pressure plates 70 and 72 which presses the heater elements 22 and 24 against the strip 21 which in turn is pressed against a platen 74. The pressure plate also provides electrical connection between the heater elements and an external power source (not shown). Heat generated by electric current in the resistance wire fuses the PVC core of the heater elements to the welding strip 21. Any conventional means may be used for pressing the heaters 70 and 72 downwardly during the fusing operation and withdrawing them after the fusion is completed, such as an hydraulic or pneumatic press 73. The strip 21 is advanced in increments corresponding to the length of the heaters 70 and 72, the forward motion being interrupted during the fusing operation. The resulting welding strip with attached heater elements is wound on a suitable take-up reel 76.

To install the welding strip, an integral number of 12 inch sections of the welding strip is cut off to provide a strip of length equal to or in excess of the circumference of the liner at the joint. If an integral number of heater sections exceeds the circumference of the liner, the excess strip can be cut off after the bonding operation is completed.

The length of welding strip is then wrapped around the outer circumference of a weld forming ring, indicated generally at 80. The weld forming ring, preferably is formed of two spring steel bands 82 and 84 which are positioned parallel to each other and extend around the circumference of the inside of the pipe with which it is being used. The bands 82 and 84 are held in spaced apart parallel relationship by metal crossmembers 86 which are electrically insulated form the bands 82 and 84 by a layer of insulation indicated at 88 and 90, respectively. The cross-members 86 are bolted to the bands 82 and 84 by bolts 92 and 94 which pass through holes in the transverse members 86. The bolt 92 is completely insulated electrically from the member 86 by an insulating sleeve 95 and an outer insulating layer 96. The head of the bolt 94 on the other hand is in electrical contact with the member 86. This arrangement is provided on alternate ones of the cross-members 86. At intermediate cross-members, the bolt 94 is insulated from the cross-member 86 while the bolt 92 is in contact. Thus the cross-members 86 are alternately electrically connected to one and the other of the pair of bands 82 and 84. Each cross-member 86 is provided with a pair of binding posts 98 and 100 to which the electrical heaters are connected, as hereinafter described.

The bands 82 and 84 are formed into a closed loop with the ends being joined by a turnbuckle type expanding mechanism, indicated generally at 102. Wrapped around the outside of the band of the ring formed by the bands 82 and 84 is an inflatable rubber tube 104. The tube is normally in a flat condition with the margins being wrapped around the edges of the ring and the margins being formed with a series of tabs 106, the tabs being provided with eyelets 108 through which a suitable lacing 110 is threaded to hold the tube 104 in position. Air is admitted into the tube through a suitable valve stem 112.

Before the weld forming ring is put in position, the weld strip is wrapped on the outer circumference of the ring and the heater element terminals formed by the twisted wire loops 58 are brought around and secured to the binding posts 98 and 100 at each of the cross-members 86. The weld forming ring is then placed in position at one of the joints in the liner with the welding strip being positioned to bridge the gap between the ends of the liners in the adjacent sections of pipe. The turnbuckle 102 is adjusted to expand the ring and hold the assembly securely in position. Air is then pumped into the tube 104 through the valve stem 112 to press the welding strip tightly against the liners with a uniform pressure around the full circumference of the welding strip. The pressure need be only a few pounds per square inch so that a tire pump, for example, can be used to inflate the tube 104.

With the welding strip in place, a battery cart 116 is brought into position and a pair of battery cables 118 and 120 are connected to binding posts 122 and 124 joined respectively to the two metal bands 82 and 84. While a battery power pack is shown in the preferred embodiment, power can be supplied from other conventional sources. As shown in the schematic diagram of FIG. 5, a plurality of standard lead cell batteries 126 are connected to provide current for heating the elements 22 and 24 in the welding strip. The batteries are connected through a standard interval timer switch 128 to the cables 118 and 120. The heater elements 22 and 24 have their connectors 58 connected to the binding posts 98 and 100 at each of the cross-members 86. Since the bolts 92 are fully insulated while the bolts 94 provide an electrical connection between the cross-member and alternately one and the other of the metal bands 82 and 84, each heater section is connected in parallel with all the other sections of both heater elements across the terminals of the batteries 126. See FIG. 5. Thus the current through each heater element section between adjacent connectors 58 dissipates the same number of watts regardles of the overall length of the welding strip. The required welding time as set by the interval timer 128 therefore remains substantially the same regardless of the number of heater sections involved in the fusing of a particular welding strip, as long as the total load does not exceed the capacity of the battery supply.

About 30 to 40 seconds is generally required to produce fusion between the liners and the core of the heater elements and thereby completing the bond between the welding strip 21 and the liners 18 and 20. After fusion is completed, the tube 104 is deflated and the ring 80 is removed after the connector wires 58 are disconnected from the binding posts 98 and 100. After the ring 80 is removed, the connector wires are cut off even with the edges of the welding strip. The helical portion or the heater wire remains imbedded in the fused junction between the welding strip and the liners.

What is claimed is:

1. A method of joining the thermoplastic lining at a joint between adjacent lined pipe sections comprising the steps of: forming an elongated flat strip of thermoplastic material, attaching a pair of elongated resistance heater elements in spaced parallel relation longitudinally along one surface of the strip, applying the strip around the inside of the joint with the width of the strip bridging the joint and with the heater elements in contact with the liners respectively on either side of the joint, applying pressure radially outwardly against the strip to urge the strip against the adjoining liners, forming a plurality of electrical connections to the respective heater elements at equally spaced intervals along the length of the strip, and applying a voltage between each pair of adjacent connections of each of the heater elements.

2. The method of claim 1 wherein the voltage is applied by electrically connecting alternate ones of said electrical connections to one terminal of a voltage source, and connecting the remaining connections to the other terminal of a voltage source.

3. The method of claim 1 further including the steps of forming the heater elements by wrapping resistance wire in a helix on an elongated filament of thermoplastic material, laying the filaments along the margin of the strip, heating the filaments by passing electric current through the resistance wire, and pressing the filaments against the strip to fuse the filaments to the strip.

* * * * *